（12）United States Patent
Papasakellariou et al.

(10) Patent No.: US 10,123,319 B2
(45) Date of Patent: *Nov. 6, 2018

(54) EXTENSION OF PHYSICAL DOWNLINK CONTROL SIGNALING IN A COMMUNICATION SYSTEM

(71) Applicant: Samsung Electronics Co., Ltd., Gyeonggi-do (KR)

(72) Inventors: Aris Papasakellariou, Houston, TX (US); Joon-Young Cho, Gyeonggi-do (KR); Hyoung-Ju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,260

(22) Filed: Mar. 7, 2017

(65) Prior Publication Data
US 2017/0181144 A1  Jun. 22, 2017

Related U.S. Application Data

(63) Continuation of application No. 14/810,173, filed on Jul. 27, 2015, now Pat. No. 9,591,636, which is a
(Continued)

(51) Int. Cl.
H04W 4/40 (2018.01)
H04W 72/04 (2009.01)
(Continued)

(52) U.S. Cl.
CPC .......... *H04W 72/042* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS 8,441,996 B2   5/2013  Kim et al.
2008/0232495 A1  9/2008  Yu et al.
(Continued)

FOREIGN PATENT DOCUMENTS

CA    2 767 997      1/2011
CN    101453303     6/2009
(Continued)

OTHER PUBLICATIONS

Mikio Iwamura et al., "Carrier Aggregation Framework in 3GPP LTE-Advanced", IEEE Communications Magazine, Aug. 2010.
(Continued)

*Primary Examiner* — Edan Orgad
*Assistant Examiner* — Sithu Ko
(74) *Attorney, Agent, or Firm* — The Farrell Law Firm, P.C.

(57) ABSTRACT

Methods and apparatus are provided for the transmission of physical downlink control signaling. In one method, a User Equipment (UE) receives information associated with a physical resource block (PRB) for enhanced physical downlink control channel (EPDCCH) from a base station. Based on either first information received on physical control format indicator channel (PCFICH) or second information received on higher layer signaling, the UE determines a starting orthogonal frequency division multiple (OFDM) symbol on which EPDCCH transmission starts. The UE receives control information on the EPDDCH based on the information associated with the PRB and the determined starting OFDM symbol.

20 Claims, 10 Drawing Sheets

Related U.S. Application Data continuation of application No. 14/554,999, filed on Nov. 26, 2014, now Pat. No. 9,094,968, which is a continuation of application No. 13/524,548, filed on Jun. 15, 2012, now Pat. No. 8,923,201.

(60) Provisional application No. 61/591,067, filed on Jan. 26, 2012, provisional application No. 61/497,330, filed on Jun. 15, 2011.

(51) Int. Cl.
*H04L 27/26* (2006.01)
*H04L 5/00* (2006.01)
*H04L 1/18* (2006.01)

(52) U.S. Cl.
CPC ........ *H04L 5/0055* (2013.01); *H04L 27/2601* (2013.01); *H04L 27/2602* (2013.01); *H04W 72/044* (2013.01); *H04L 1/1861* (2013.01)

(56) References Cited

U.S. PATENT DOCUMENTS

| | | | |
|---|---|---|---|
| 2009/0046793 | A1 | 2/2009 | Love et al. |
| 2009/0209247 | A1 | 8/2009 | Lee et al. |
| 2009/0245198 | A1 | 10/2009 | Tiirola et al. |
| 2010/0165847 | A1 | 7/2010 | Kamuf et al. |
| 2010/0227569 | A1 | 9/2010 | Bala et al. |
| 2010/0303011 | A1 | 12/2010 | Pan et al. |
| 2010/0317360 | A1 | 12/2010 | McBeath et al. |
| 2011/0044391 | A1 | 2/2011 | Ji et al. |
| 2011/0051841 | A1 | 3/2011 | Ahn et al. |
| 2011/0064115 | A1 | 3/2011 | Xu et al. |
| 2011/0075624 | A1 | 3/2011 | Papasakellariou et al. |
| 2011/0165906 | A1 | 7/2011 | Papasakellariou et al. |
| 2011/0170496 | A1* | 7/2011 | Fong ............... H04L 5/0053 370/329 |
| 2011/0268064 | A1 | 11/2011 | Chen et al. |
| 2011/0317610 | A1 | 12/2011 | Park et al. |
| 2012/0002593 | A1 | 1/2012 | Kim et al. |
| 2012/0128039 | A1 | 2/2012 | Kim et al. |
| 2012/0063386 | A1 | 3/2012 | Park et al. |
| 2012/0122472 | A1 | 5/2012 | Krishnarnurthy et al. |
| 2012/0163437 | A1 | 6/2012 | Frederiksen et al. |
| 2012/0207099 | A1* | 8/2012 | Lindh ............... H04L 5/0039 370/329 |
| 2012/0213147 | A1 | 8/2012 | Noh et al. |
| 2013/0039284 | A1 | 2/2013 | Marinier et al. |
| 2013/0201975 | A1 | 8/2013 | Chen et al. |
| 2013/0242904 | A1 | 9/2013 | Sartori et al. |
| 2014/0086201 | A1 | 3/2014 | Nagata et al. |
| 2014/0301286 | A1 | 10/2014 | Abe et al. |
| 2015/0085742 | A1 | 3/2015 | Chung et al. |
| 2015/0334690 | A1 | 11/2015 | Papasakellariou et al. |
| 2015/0358926 | A1 | 12/2015 | Zhang et al. |

FOREIGN PATENT DOCUMENTS

| | | |
|---|---|---|
| CN | 101772179 | 7/2010 |
| CN | 101911792 | 12/2010 |
| JP | 2012-235354 | 11/2012 |
| JP | 2012-235360 | 11/2012 |
| JP | 2014-508471 | 4/2014 |
| WO | WO 2010/101366 | 9/2010 |
| WO | WO 2010/101432 | 9/2010 |
| WO | WO 2010/128816 | 11/2010 |
| WO | WO 2011/000440 | 1/2011 |
| WO | WO 2011/008013 | 1/2011 |
| WO | WO 2011/008047 | 1/2011 |
| WO | WO 2011/021852 | 2/2011 |
| WO | WO 2011/049379 | 4/2011 |

OTHER PUBLICATIONS

Korean Office Action dated Jan. 23, 2015 issued in counterpart application No. 10-2013-7032165.
Zte, "Considerations on Demodulation Reference Signal in Backhaul Downlink", TSG-RAN WG1 #58, Aug. 24-28, 2009.
Qualcomm Incorporated, "Interleaver for R-PD", R1-103555, 3GPP TSG-RAN WG1 #61bis, Jun. 28-Jul. 2, 2010.
3rd Generation Partnership Project; Technical Specification Group Radio Access Network; Evolved Universal Terrestrial Radio Access (E-UTRA); Physical Layer Procedures (Release 8), 3GPP TS 36.213 V8.8.0, Sep. 2009.
Ericsson, "Enhancements for UE Specific Control Signaling", Tdoc R1-111332, 3GPP TSG-RAN WG1 # 65, May 9-13, 2011.
European Search Report dated May 7, 2015 issued in counterpart application No. 12800570.9-1851.
Samsung, "Discussion on Downlink Control Channel", R1-111471, 3GPP TSG-RAN1#65 meeting, May 9-13, 2011, 5 pages.
Chinese Office Action dated Dec. 18, 2015 issued in counterpart application No. 201280029478.6, 18 pages.
LG Electronics, "Discussions on DL Control Signaling Enhancement", R1-111789, 3GPP TSG RAN WG1 Meeting #65, May 9-13, 2011, 3 pages.
Japanese Office Action dated Jun. 13, 2016 issued in counterpart application No. 2014-515760, 6 pages.
Chinese Office Action dated Aug. 1, 2016 issued in counterpart application No. 201280029478.6, 23 pages.
U.S. Appl. No. 61/441,846.
Samsung, "R-PDCCH Design", R1-102218, 3GPP TSG RAN WG1 Meeting #60bis, Apr. 12-16, 2010, 4 pages.
Japanese Office Action dated Mar. 6, 2017 issued in counterpart application No. 2014-515760, 9 pages.
Korean Office Action dated Sep. 17, 2018 issued in counterpart application No. 10-2015-0001939, 5 pages.
Japanese Office Action dated Jul. 30, 2018 issued in counterpart application No. 2017-075050, 8 pages.

* cited by examiner

EXTENSION OF PHYSICAL DOWNLINK CONTROL SIGNALING IN A COMMUNICATION SYSTEM

PRIORITY

The present application is a Continuation Application of, and claims priority under 35 U.S.C. § 120 to, U.S. patent application Ser. No. 14/810,173, filed on Jul. 27, 2015 and issuing on Mar. 7, 2017 as U.S. Pat. No. 9,591,636, which was a Continuation Application of, and claims priority under 35 U.S.C. § 120 to, U.S. patent application Ser. No. 14/554,999, filed on Nov. 26, 2014 and issued on Jul. 28, 2015 as U.S. Pat. No. 9,094,968, which was a Continuation Application of, and claimed priority under 35 U.S.C. § 120 to, U.S. patent application Ser. No. 13/524,548, filed on Jun. 15, 2012 and issued on Dec. 30, 2014 as U.S. Pat. No. 8,923,201, which claimed priority under 35 U.S.C. § 119(e) to U.S. Provisional Application Nos. 61/497,330 and 61/591,067, which were filed in the United States Patent and Trademark Office on Jun. 15, 2011 and Jan. 26, 2012, respectively. The contents of all of the above are incorporated herein by reference.

BACKGROUND OF THE INVENTION

1. Field of the Invention

The present invention is directed generally to wireless communication systems and, more particularly, to the transmission of physical downlink control signaling.

2. Description of the Art

A communication system includes a DownLink (DL) that conveys transmission signals from transmission points, such as Base Stations (BS) or NodeBs to User Equipments (UEs), and an UpLink (UL) that conveys transmission signals from UEs to reception points such as the NodeBs. A UE, also commonly referred to as a terminal or a mobile station, may be fixed or mobile and may be a cellular phone, a personal computer device, etc. A NodeB is generally a fixed station and may also be referred to as an access point or some other equivalent terminology.

DL signals include data signals carrying information content, control signals, and Reference Signals (RSs), which are also known as pilot signals. A NodeB conveys data signals to UEs through Physical Downlink Shared CHannels (PDSCHs) and control signals to UEs through Physical Downlink Control CHannels (PDCCHs). UL signals also include data signals, control signals, and RS. UEs convey data signals to NodeBs through Physical Uplink Shared CHannels (PUSCHs) and control signals to NodeBs through Physical Uplink Control CHannels (PUCCHs). It is possible for a UE having transmission of data information to also convey control information through the PUSCH.

Downlink Control Information (DCI) serves several purposes and is conveyed through DCI formats transmitted in PDCCHs. For example, DCI includes DL Scheduling Assignments (SAs) for PDSCH reception and UL SAs for PUSCH transmission. Because PDCCHs are a major part of a total DL overhead, their resource requirements directly impact the DL throughput. One method for reducing PDCCH overhead is to scale its size according to the resources required to transmit the DCI formats during a DL Transmission Time Interval (TTI). Assuming Orthogonal Frequency Division Multiple (OFDM) as the DL transmission method, a Control Channel Format Indicator (CCFI) parameter transmitted through the Physical Control Format Indicator CHannel (PCFICH) can be used to indicate the number of OFDM symbols occupied by the PDCCHs in a DL TTI.

FIG. 1 illustrates a conventional structure for PDCCH transmissions in a DL TTI.

Referring to FIG. 1, a DL TTI is assumed to consist of one subframe having N=14 OFDM symbols. A DL control region including the PDCCH transmissions occupies a first M OFDM symbols 110, i.e., M=3. A remaining N-M OFDM symbols are used primarily for PDSCH transmissions 120, i.e., M-N=9. A PCFICH 130 is transmitted in some sub-carriers, also referred to as Resource Elements (REs), of a first OFDM symbol and includes 2 bits indicating a DL control region size, e.g., M=1, M=2, or M=3 OFDM symbols.

For two NodeB transmitter antennas, some OFDM symbols also include respective RS REs 140 and 150. These RSs are transmitted substantially over an entire DL operating BandWidth (BW) and are referred to as Common RSs (CRSS) as they can be used by each UE to obtain a channel estimate for its DL channel medium and to perform other measurements. Herein, a PDCCH transmitted with the conventional structure illustrated in FIG. 1 will be referred to as a cPDCCH.

Additional control channels may be transmitted in a DL control region, but they are not shown for brevity. For example, assuming the use of a Hybrid Automatic Repeat reQuest (HARQ) process for data transmission in a PUSCH, a NodeB may transmit a Physical Hybrid-HARQ Indicator CHannel (PHICH) to indicate to UEs whether or not their previous PUSCH transmissions were correctly received.

FIG. 2 illustrates a conventional encoding process for a DCI format.

Referring to FIG. 2, a NodeB separately codes and transmits each DCI format in a respective PDCCH. A Radio Network Temporary Identifier (RNTI) for a UE for which a DCI format is intended masks the Cyclic Redundancy Check (CRC) of a DCI format codeword in order to enable the UE to identify that the particular DCI format is intended for it. For example, both the CRC and the RNTI have 16 bits. The CRC 220 of the (non-coded) DCI format bits 210 is computed and it is subsequently masked 230 using the exclusive OR (XOR) operation between the CRC and RNTI bits 240. Accordingly, XOR(0,0)=0, XOR(0,1)=1, XOR(1,0)=1, and XOR(1,1)=0.

Thereafter, the masked CRC is appended to the DCI format information bits 250, channel coding is performed 260, e.g., using a convolutional code, and rate matching 270 is performed to the allocated resources. Interleaving and modulation 280 is performed, and a control signal 290 then transmitted.

FIG. 3 illustrates a conventional decoding process for a DCI format.

Referring to FIG. 3, a UE receiver performs the reverse operations of a NodeB transmitter to determine if the UE has a DCI format assignment in a DL subframe.

Specifically, a received control signal 310 is demodulated and the resulting bits are de-interleaved 320, a rate matching applied in a NodeB transmitter is restored 330, and data is subsequently decoded 340. After decoding, DCI format information bits 360 are obtained after extracting CRC bits 350, which are then de-masked 370 by applying the XOR operation with a UE RNTI 380. Finally, a UE performs a CRC test 390. If the CRC test passes, a UE considers a DCI format to be valid and determines parameters for signal reception or signal transmission. If the CRC test does not pass, a UE disregards the DCI format.

The DCI format information bits correspond to several fields, or Information Elements (IEs), e.g., the Resource Allocation (RA) IE indicating the part of the operating BandWidth (BW) allocated to a UE for PDSCH reception or PUSCH transmission, the Modulation and Coding Scheme (MCS) IE indicating the data MCS, the IE related to the HARQ operation, etc. The BW unit for PDSCH or PUSCH transmissions is assumed to consist of several REs, e.g., 12 REs, and will be referred to herein as a Resource Block (RB). Additionally, a RB over one subframe will be referred to as a Physical RB (PRB).

To avoid a cPDCCH transmission to a UE blocking a cPDCCH transmission to another UE, the location of each cPDCCH transmission in the time-frequency domain of a DL control region is not unique and, as a consequence, each UE performs multiple decoding operations to determine whether there are cPDCCHs intended for it in a DL subframe. The REs carrying each cPDCCH are grouped into conventional Control Channel Elements (cCCEs) in the logical domain. For a given number of DCI format bits in FIG. 2, the number of cCCEs for a respective cPDCCH depends on a channel coding rate (Quadrature Phase Shift Keying (QPSK) is assumed as the modulation scheme). A NodeB may use a lower channel coding rate and more cCCEs for cPDCCH transmission to UEs experiencing low DL Signal-to-Interference and Noise Ratio (SINR) than to UEs experiencing a high DL SINR. The cCCE aggregation levels include, for example, 1, 2, 4, and 8 cCCEs.

For a cPDCCH decoding process, a UE may determine a search space for candidate cPDCCH transmissions after restoring the cCCEs in the logical domain according to a common set of cCCEs for all UEs (UE-Common Search Space or UE-CSS) and according to a UE-dedicated set of cCCEs (UE-Dedicated Search Space or UE-DSS). For example, the UE-CSS includes the first C cCCEs in the logical domain. The UE-DSS may be determined according to a pseudo-random function having as inputs UE-common parameters, such as the subframe number or the total number of cCCEs in the subframe, and UE-specific parameters such as the RNTI. For example, for cCCE aggregation levels $L \in \{1,2,4,8\}$, the cCCEs corresponding to cPDCCH candidate m are given by Equation (1).

$$\text{cCCEs for cPDCCH candidate } m = L \cdot \{(Y_k + m) \bmod \lfloor N_{CCE,k}/L \rfloor\} + i \quad (1)$$

In Equation (1), $N_{CCE,k}$ is the total number of cCCEs in subframe k, $i=0, \ldots, L-1$, $m=0, \ldots, M_C^{(L)}-1$, and $M_C^{(L)}$ is the number of cPDCCH candidates to monitor in the search space. Exemplary values of $M_C^{(L)}$ for $L \in \{1,2,4,8\}$ are $\{6, 6, 2, 2\}$, respectively. For the UE-CSS, $Y_k=0$. For the UE-DSS, $Y_k=(A \cdot Y_{k-1}) \bmod D$, where $Y_{-1}=\text{RNTI} \neq 0$, $A=39827$, and $D=65537$.

DCI formats conveying information to multiple UEs are transmitted in a UE-CSS. Additionally, if enough cCCEs remain after the transmission of DCI formats conveying information to multiple UEs, a UE-CSS may also convey some DCI formats for DL SAs or UL SAs. A UE-DSS exclusively conveys DCI formats for DL SAs or UL SAs. For example, a UE-CSS may include 16 cCCEs and support 2 DCI formats with L=8 cCCEs, 4 DCI formats with L=4 cCCEs, 1 DCI format with L=8 cCCEs, or 2 DCI formats with L=4 cCCEs. The cCCEs for a UE-CSS are placed first in the logical domain (prior to interleaving).

FIG. 4 illustrates a conventional transmission process for cPDCCHs.

Referring to FIG. 4, after channel coding and rate matching, as illustrated in FIG. 2, the encoded DCI format bits are mapped, in the logical domain, to cCCEs 400 of a cPDCCH. The first 4 cCCEs (L=4), i.e., cCCE1 401, cCCE2 402, cCCE3 403, and cCCE4 404, are used for cPDCCH transmission to UE. The next 2 cCCEs (L=2), i.e., cCCE5 411 and cCCE6 412, are used for cPDCCH transmission to UE2. The next 2 cCCEs (L=2), i.e., cCCE7 421 and cCCE8 422, are used for cPDCCH transmission to UE3. Finally, the last cCCE (L=1), i.e., cCCE9 431, is used for cPDCCH transmission to UE4.

The DCI format bits are scrambled by a binary scrambling code in step 440 and are subsequently modulated in step 450. Each cCCE is further divided into mini-cCCEs or Resource Element Groups (REGs). For example, a cCCE including 36 REs can be divided into 9 REGs, each having 4 REs. Interleaving is applied among REGs (blocks of 4 QPSK symbols) in step 460. For example, a block interleaver may be used where interleaving is performed on symbol-quadruplets (4 QPSK symbols corresponding to the 4 REs of a REG) instead of on individual bits.

After interleaving the REGs, a resulting series of QPSK symbols may be shifted by J symbols in step 470, and finally, each QPSK symbol is mapped to an RE in a DL control region in step 480. Therefore, in addition to RSs 491 and 492 from NodeB transmitter antennas, and other control channels such as a PCFICH 493 and a PHICH (not shown), REs in a DL control region include QPSK symbols for cPDCCHs corresponding to DCI formats for UE1 494, UE2 495, UE3 496, and UE4 497.

A UE may transmit an ACKnowledgement signal associated with a HARQ process (HARQ-ACK signal) in a PUCCH in response to a reception of one or more data Transport Blocks (TBs) in a PDSCH. When a PDSCH is scheduled by a DL SA in a respective cPDCCH, a UE may implicitly derive a PUCCH resource $n_{PUCCH}$ for a HARQ-ACK signal transmission from the index of a first cCCE, $n_{CCE}$, of a respective cPDCCH transmission. Therefore, for a PDSCH reception in a given DL subframe, a UE determines a PUCCH resource for an associated HARQ-ACK signal transmission in a subsequent UL subframe as $n_{PUCCH} = f(n_{CCE})$, where f( ) is a function providing a one-to-one mapping between a cCCE number and a PUCCH resource.

For example, $f(n_{CCE}) = n_{CCE} + N_{PUCCH}$, where $N_{PUCCH}$ is an offset a NodeB informs to UEs by Radio Resource Control (RRC) signaling. If a UE is to determine multiple PUCCH resources for HARQ-ACK signal transmission, resources associated with several consecutive cCCEs after a first cCCE of a respective cPDCCH are used. For example, a second PUCCH resource may be obtained from $f(n_{CCE}+1)$. A UE can determine the total number of cCCEs used to transmit cPDCCHs in a subframe after decoding the PCFICH as, for a predetermined configuration of CRS REs, PHICH REs, and PCFICH REs, the number of cCCEs can be uniquely determined from the number of respective OFDM symbols.

The cPDCCH structure illustrated in FIG. 4 uses a maximum of M=3 OFDM symbols and transmits a control signal over an operating DL BW. Consequently, THE cPDCCH structure has limited capacity and cannot achieve interference co-ordination in the frequency domain.

There are several cases in which expanded capacity or interference co-ordination in the frequency domain is used for PDCCH transmissions. One such case is a communication system with cell aggregation, where the DL SAs or UL SAs to UEs in multiple cells are transmitted in a single cell (for example, because other cells may convey only PDSCH). Another case is extensive use of spatial multiplexing for PDSCH transmissions where multiple DL SAs correspond to same PDSCH resources. Another case is when DL transmissions from a first NodeB experience strong interference from DL transmissions from a second NodeB and DL interference co-ordination in the frequency domain between the two cells is needed.

A direct extension of a maximum DL control region size to more than M=3 OFDM symbols is not possible at least due to the requirement to support UEs which cannot be aware of such extension. Accordingly, a conventional alternative is to extend a DL control region in a PDSCH region and use individual PRBs for transmissions of control signals. Herein, a PDCCH transmitted in this manner will be referred to as enhanced PDCCH (ePDCCH).

FIG. 5 illustrates a conventional use of PRBs for ePDCCH transmissions in a DL TTI.

Referring to FIG. 5, although ePDCCH transmissions start immediately after cPDCCH transmissions 510 and are over all remaining DL subframe symbols, alternatively, they may start at a fixed location, such as the fourth OFDM symbol, and extend over a part of remaining DL subframe symbols. The ePDCCH transmissions occurs in four PRBs, 520, 530, 540, and 550, while remaining PRBs may be used for PDSCH transmissions 560, 562, 564, 566, and 568.

An ePDCCH reception may be based on a CRS or on a DemoDulation RS (DMRS). The DMRS is UE-specific and is transmitted in a subset of REs in PRBs used for an associated ePDCCH transmission.

FIG. 6 illustrates a conventional structure for DMRS REs in a PRB associated with a PDSCH.

Referring to FIG. 6, DMRS REs 610 are placed in a PRB. For two NodeB transmitter antenna ports, a DMRS transmission from a first antenna port is assumed to apply an Orthogonal Covering Code (OCC) of {1, 1} over two DMRS REs located in a same frequency position and are successive in the time domain, while a DMRS transmission from a second antenna port is assumed to apply an OCC of {1, −1}. A UE receiver estimates a channel experienced by a signal from each NodeB transmitter antenna port by removing a respective OCC.

Several aspects for a combined cPDCCH and ePDCCH operation in FIG. 5 still need to be defined in order to provide a functional design. One aspect is a process for a UE to detect cPDCCHs and ePDCCHs. To avoid increasing a UE decoding complexity and a probability that a UE incorrectly assumes a cPDCCH or an ePDCCH as intended for it (i.e., a false CRC check), it is desirable that a total number of respective decoding operations is substantially the same as when a UE does not monitor any ePDCCH transmissions (for example, as illustrated in FIG. 1).

Another aspect is that for ePDCCH reception based on a DMRS, a desired reliability of channel estimate should be ensured especially for UEs experiencing low DL SINR and requiring highly reliable ePDCCH receptions. Unlike the case with a CRS, time-domain interpolation across different DL subframes may not be possible with a DMRS and, as an ePDCCH transmission is assumed to be either in one PRB or in two or more non-adjacent PRBs, frequency-domain interpolation across different PRBs may also be impossible.

Another aspect is a PUCCH resource determination for a HARQ-ACK signal transmission in response to a reception of TBs conveyed in a PDSCH scheduled by a respective DL SA transmitted in an ePDCCH.

Therefore, there is a need for an ePDCCH decoding process at a UE in a communication system supporting both cPDCCHs and ePDCCHs.

There is another need for a UE to determine a PUCCH resource for HARQ-ACK signal transmission in response to a reception of data TBs conveyed in a PDSCH scheduled by a respective DL SA transmitted in an ePDCCH.

Further, there is another need to enhance the reliability of a channel estimate provided by the DMRS in a PRB conveying ePDCCH beyond the one obtained in a PRB conveying PDSCH.

SUMMARY OF THE INVENTION

The present invention has been designed to solve at least the aforementioned limitations and problems in the prior art and provide at least the advantages described below.

According to one aspect of the present invention, a method for wireless communication in a user equipment (UE) is provided, including receiving information associated with a physical resource block (PRB) for enhanced physical downlink control channel (EPDCCH); determining a starting orthogonal frequency division multiple (OFDM) symbol in which EPDCCH transmission starts, based on either first information received on physical control format indicator channel (PCFICH) or second information received on higher layer signaling; and receiving control information on the EPDDCH based on the information associated with the PRB and the determined starting OFDM symbol.

According to another aspect of the present invention, a user equipment (UE) for wireless communication is provided, the UE including: a receiver configured to receive information associated with a physical resource block (PRB) for enhanced physical downlink control channel (EPDCCH); and a search configured to determine a starting orthogonal frequency division multiple (OFDM) symbol in which enhanced physical downlink control channel (EPDCCH) transmission starts, based on either first information received on physical control format indicator channel (PCFICH) or second information received on higher layer signaling, wherein the receiver is further configured to receive control information on the EPDDCH based on the information associated with the PRB and the determined starting OFDM symbol.

According to yet another aspect of the present invention, a method for wireless communication in a base station is provided, including: transmitting information associated with a physical resource block (PRB) for enhanced physical downlink control channel (EPDCCH) and at least one of first information on physical control format indicator channel (PCFICH) and second information on higher layer signaling; determining a starting orthogonal frequency division multiple (OFDM) symbol in which EPDCCH transmission starts, based on either the first information on the PCFICH or the second information on the higher layer signaling; and transmitting control information on the EPDDCH based on the information associated with the PRB and the determined starting OFDM symbol.

According to still another aspect of the present invention, a base station for wireless communication is provided, including: a transmitter configured to transmit information associated with a physical resource block (PRB) for enhanced physical downlink control channel (EPDCCH) and at least one of first information on physical control format indicator channel (PCFICH) and second information on higher layer signaling; and a selector configured to determine a starting orthogonal frequency division multiple (OFDM) symbol in which EPDCCH transmission starts, based on either the first information on the PCFICH or the second information on the higher layer signaling, wherein the transmitter is further configured to transmit control information on the EPDDCH based on the information associated with the PRB and the determined starting OFDM symbol.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail hereinafter with reference to the accompanying drawings. The present invention may, however, be embodied in many different forms and should not be construed as limited to the embodiments set forth herein. Rather, these embodiments are provided so that this disclosure will be thorough and complete and will fully convey the scope of the present invention to those skilled in the art.

Additionally, although the embodiments of the present invention will be described below with reference to Orthogonal Frequency Division Multiplexing (OFDM), they also are applicable to all Frequency Division Multiplexing (FDM) transmissions in general and to Discrete Fourier Transform (DFT)-spread OFDM in particular.

The embodiments of the invention do not assume a particular structure for ePDCCH transmissions. The respective PRBs are generally assumed to include at least one CCE (eCCE), which may have a same size (number of REs) as cCCEs for cPDCCH transmissions.

In a DL subframe, an eCCE size depends on a number of eCCEs per PRB, an existence of various RS types, such as CRS or DMRS, in a PRB (the respective REs cannot be used for ePDCCH transmission), a number of OFDM symbols used for ePDCCH transmissions, etc.

A PRB includes at least one ePDCCH transmission and an ePDCCH transmission may be entirely included in one PRB or be distributed over multiple PRBs.

An ePDCCH transmission may begin in an OFDM symbol immediately after the last OFDM symbol of a conventional DL control region (determined by a UE after decoding the PCFICH), or an ePDCCH transmission may begin at a fixed OFDM symbol informed to a UE by higher layer signaling. For example, an ePDCCH transmission may begin at the OFDM symbol after the one corresponding to a maximum number of OFDM symbols used for the conventional DL control region. The number of OFDM symbols used for ePDCCH transmissions may be all of the remaining OFDM symbols in a DL subframe or any subset of these remaining OFDM symbols.

In accordance with an embodiment of the present invention, a UE detection process is provided for cPDCCHs and ePDCCHs in a communication system supporting their coexistence in a same DL subframe.

Specifically, a UE is informed through higher layer signaling, e.g., RRC signaling, whether to decode only cPDCCH or only ePDCCH. For example, one bit of RRC signaling may be used for this purpose, i.e., a binary '0' indicates cPDCCH detection and a binary '1' indicates ePDCCH detection).

Figure 7:
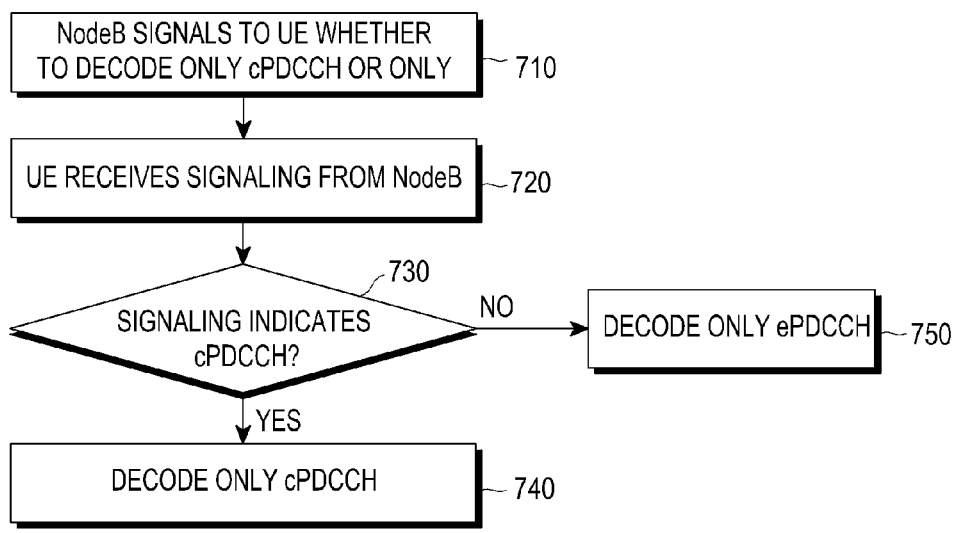
FIG. 7 is a flowchart illustrating a UE operation for cPDCCH detection or for ePDCCH detection in response to an RRC configuration, according to an embodiment of the present invention.

FIG. 7 illustrates a UE operation for cPDCCH detection or for ePDCCH detection in response to an RRC configuration, according to an embodiment of the present invention.

Referring to FIG. 7, a NodeB signals to a UE whether to decode only cPDCCH or only ePDCCH, using RRC signaling of 1 bit in step 710. A UE receives RRC signaling from a NodeB in step 720, determines whether the RRC signaling indicates decoding only cPDCCH or only ePDCCH in step 730, and decodes only cPDCCH in step 740 or only ePDCCH in step 750, based on the detection in step 730.

The above-described approach provides simplicity at the cost of increasing the blocking probability of cPDCCH or ePDCCH transmissions and of increasing the probability of resource waste (smaller utilization of respective available resources). For example, if a UE decodes only ePDCCHs, the corresponding resources in allocated PRBs may be exhausted due to ePDCCH transmissions to other UEs in a DL subframe. Therefore, an ePDCCH transmission to a referenced UE is blocked and the UE is not scheduled in a DL subframe, even though there are available resources for a NodeB to transmit cPDCCH to a referenced UE.

Further, if the allocation of PRBs for ePDCCH transmissions to UEs is configured by RRC signaling and each PRB includes several eCCEs used for ePDCCH transmissions to a same UE or to different UEs, it is possible that only some of the eCCEs in a PRB are used and the remaining ones are wasted. In such a case, partial use of PRBs for ePDCCH transmissions could be avoided if a UE was capable of detecting cPDCCH. Conversely, as the granularity of a DL control region for cPDCCH transmissions is assumed to be one OFDM symbol, a whole OFDM symbol may be used only to transmit a few cCCEs to accommodate, for example, one additional cPDCCH transmission to a UE. This additional cPDCCH transmission and a use of an additional OFDM symbol could be avoided if a referenced UE was also capable of detecting ePDCCHs.

To address the above-described shortcomings of the embodiment above, in accordance with another embodiment of the present invention a UE is provided that can decode both cPDCCHs and ePDCCHs. The search space structure for ePDCCH decoding may not necessarily be exactly the same as the one described, for example, for the UE-DSS for cPDCCH decoding, in Equation (1). However, a structure defining ePDCCH candidates $M_E^{(L)}$ for eCCE aggregation level L is again assumed. For simplicity, same aggregation levels L ∈ {1,2,4,8} for cPDCCH and ePDCCH decoding may be assumed, but not required, as will be described below.

A number of decoding operations for cPDCCHs or ePDCCHs is determined by a respective number of candidates for each possible cCCE or eCEE aggregation level, respectively. This number can be either predetermined or configured to a UE by a NodeB through RRC signaling. For example, for L ∈ {1,2,4,8}, a NodeB can configure a UE to perform an equal number of decoding operations for cPDCCH and ePDCCH and a total number of decoding operations equal to the case a UE decodes, e.g., only cPDCCH, by setting a respective number of cPDCCH candidates as $M_C^{(L)}$ ∈ {3,3,1,1} and setting a respective number of ePDCCH candidates as $M_E^{(L)}$ ∈ {3,3,1,1}. The cPDCCH candidates may be allocated to at least one of a UE-CSS or a UE-DSS.

Alternatively, a NodeB may prioritize either cPDCCH or ePDCCH decoding by a UE. For example, for L ∈ {1,2,4,8}, a NodeB can configure a UE with $M_C^{(L)}$ ∈ {1,1,0,0} cPDCCH candidates and with $M_E^{(L)}$ ∈ {5,5,2,2} ePDCCH candidates.

Figure 8:
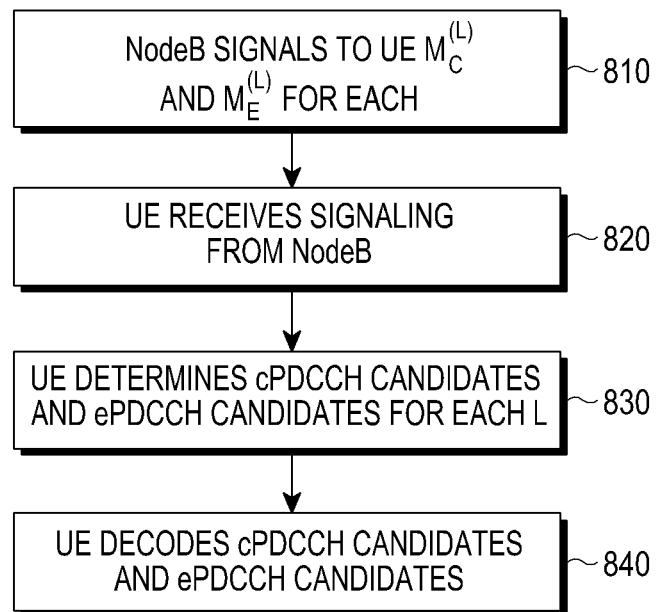
FIG. 8 is a flowchart illustrating a UE operation for decoding cPDCCH candidates and ePDCCH candidates, according to an embodiment of the present invention.

FIG. 8 illustrates a UE operation for decoding cPDCCH candidates and ePDCCH candidates, according to an embodiment of the present invention.

Referring to FIG. 8, a number of cPDCCH candidates and a number of ePDCCH candidates for each possible cCCE or eCCE aggregation level, respectively, is either configured to a UE by a NodeB through RRC signaling or is predetermined. In the former case, a NodeB signals to a UE a number of cPDCCH candidates $M_C^{(L)}$ and a number of ePDCCH candidates $M_E^{(L)}$ for each cCCE and eCCE aggregation level L in step 810. A UE receives signaling from a NodeB in step 820, determines, using for example Equation (1), each possible cPDCCH candidate and ePDCCH candidate for a respective cCCE and eCCE aggregation level L in step 830, and performs associated decoding operations in step 840.

In accordance with another embodiment of the invention, ePDCCH detection reliability is enhanced by basing demodulation on a DMRS, instead of a CRS.

Figure 1:
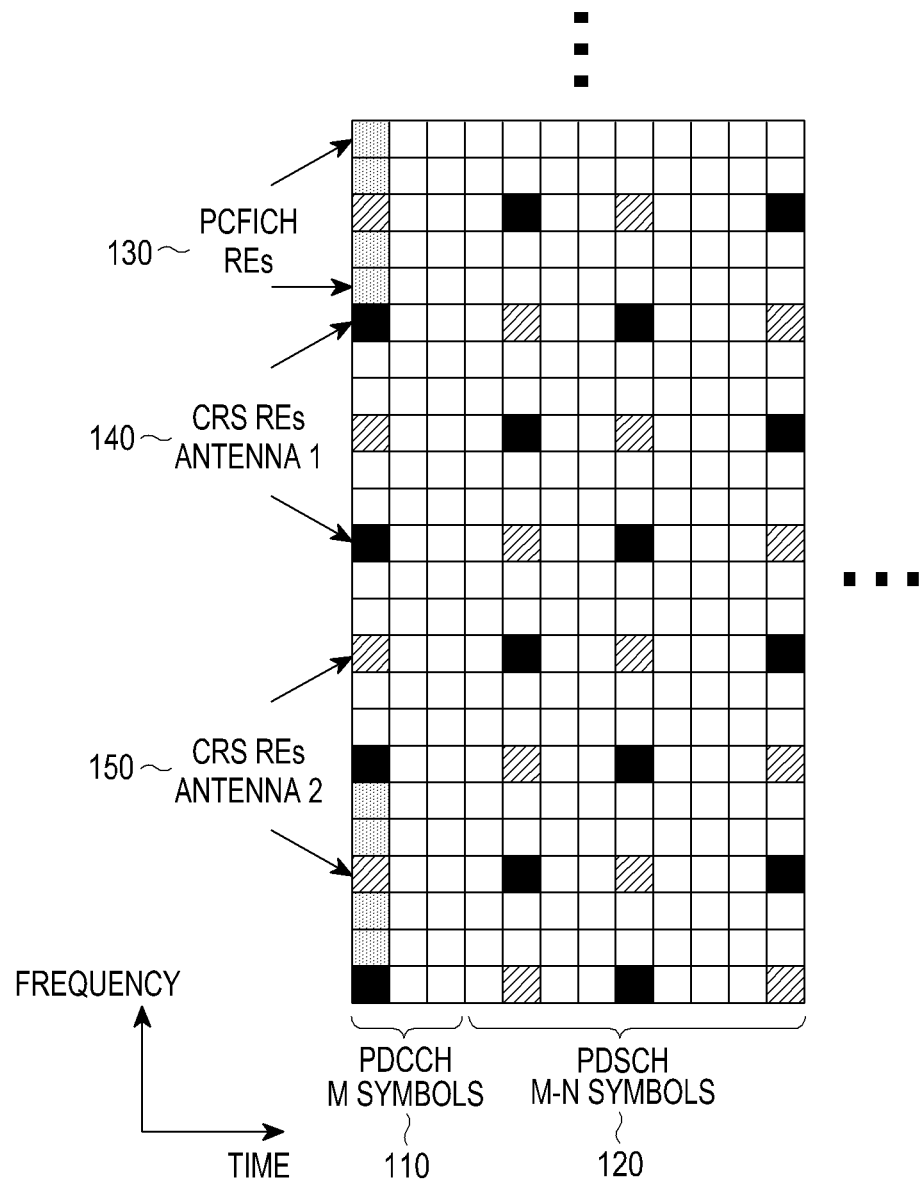
FIG. 1 is a diagram illustrating a conventional structure for cPDCCH transmissions.
Figure 2:
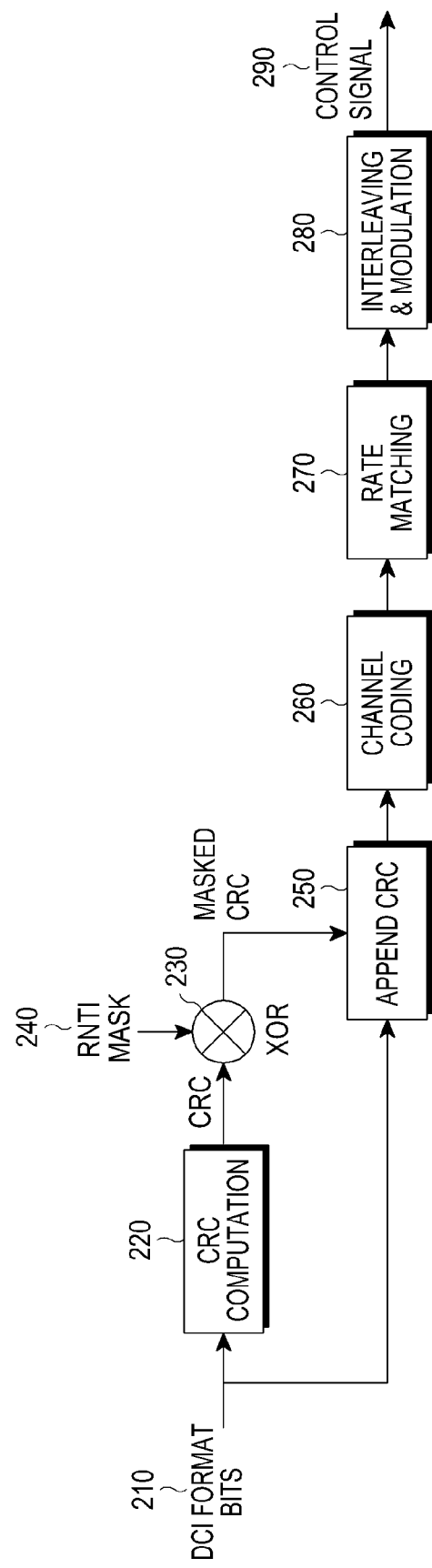
FIG. 2 is a block diagram illustrating a conventional encoding process for a DCI format.
Figure 3:
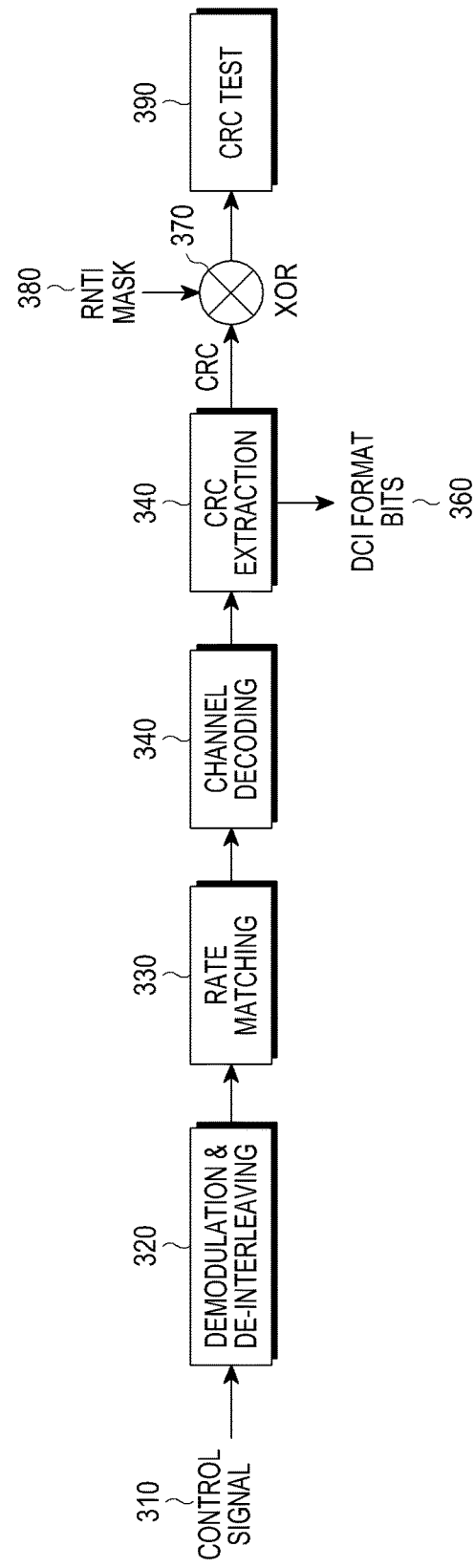
FIG. 3 is a block diagram illustrating a conventional decoding process for a DCI format.
Figure 4:
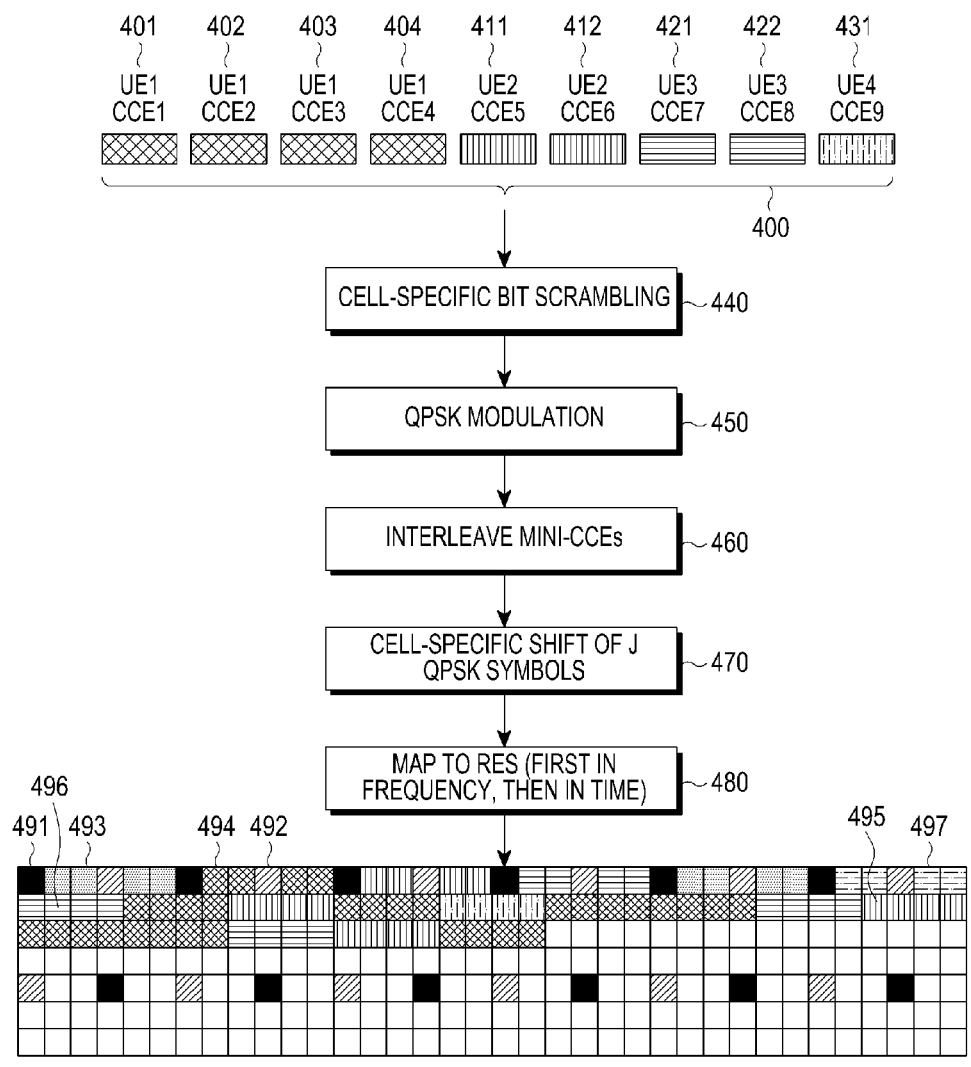
FIG. 4 is a diagram illustrating a conventional transmission process for cPDCCHs.
Figure 5:
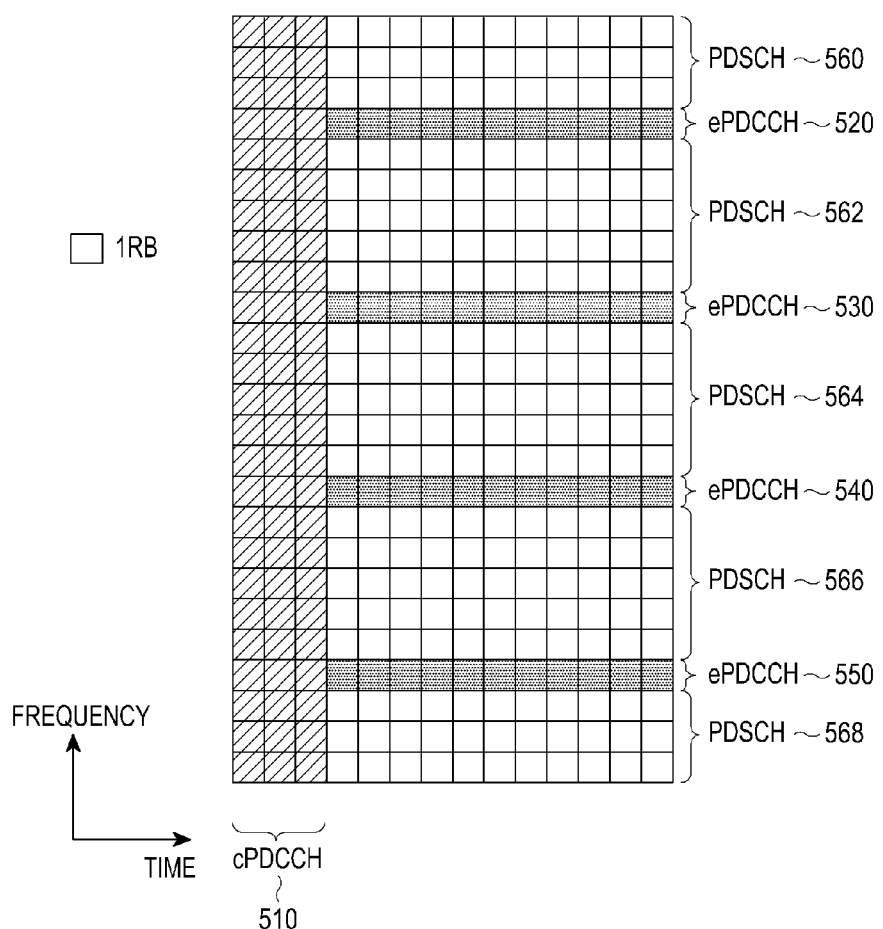
FIG. 5 is a diagram illustrating a conventional use of PRBs for ePDCCH transmissions.
Figure 6:
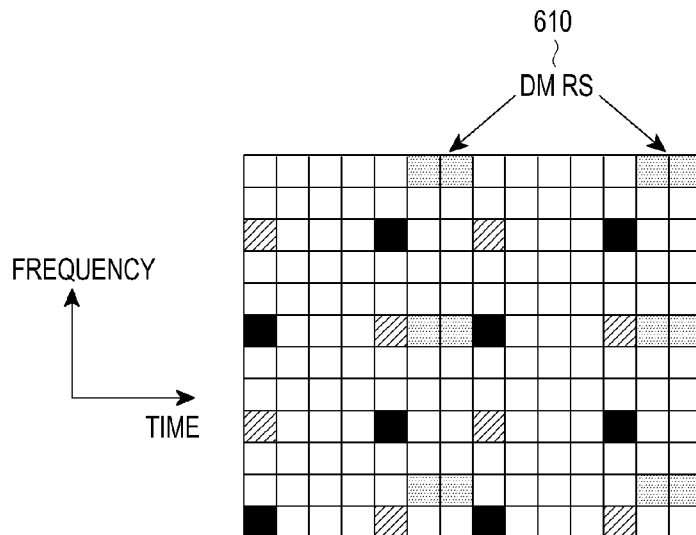
FIG. 6 is a diagram illustrating a conventional structure for DMRS REs in a PRB associated with a PDSCH.

The DMRS design in FIG. 6 is targeted for PDSCH demodulation for which a target error rate is much larger than a target error rate of ePDCCH, typically by at least an order of magnitude. Further, a PDSCH can rely on HARQ retransmissions for an eventual correct reception of a TB. Due to the more stringent requirements for ePDCCH reception reliability and in order to avoid increasing a code rate by using more eCCEs for an ePDCCH transmission, thereby increasing a respective overhead, it may often be preferable to provide a UE the ability to improve a reliability for an estimate of a channel experienced by an ePDCCH, thereby improving ePDCCH detection reliability. Further, for a largest eCCE aggregation level L, e.g., L=8 eCCEs, it may not be possible to increase the number of eCCEs allocated to an ePDCCH. It is for UEs experiencing very low DL SINRs that a largest eCCE aggregation level is used but also that channel estimation accuracy is most important.

For the DMRS design illustrated in FIG. 6, PRBs conveying ePDCCH have a larger density of DMRS (more DMRS REs) for a respective antenna port in the frequency domain, the time domain, or in both domains. The additional REs may be used to transmit additional DMRS from a respective antenna port or may remain empty and their power may be used to boost the transmission power of existing DMRS from a respective antenna port.

Figure 9:
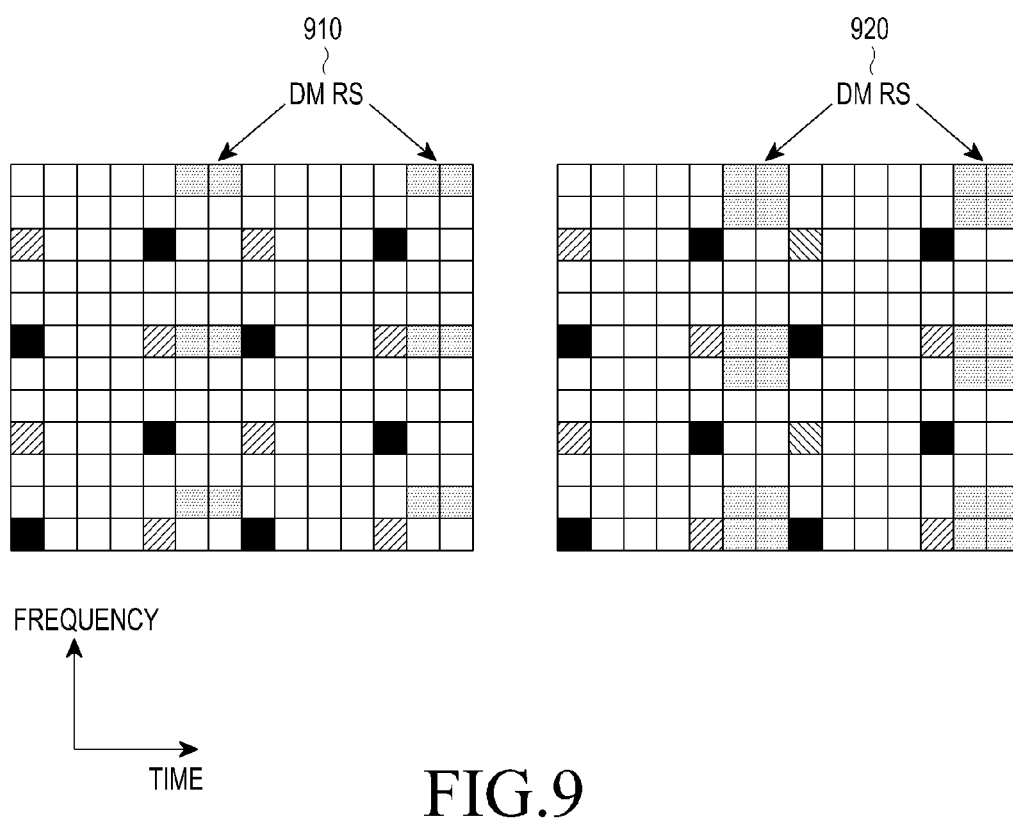
FIG. 9 is a diagram illustrating additional DMRS density structures corresponding to an antenna port in PRBs conveying ePDCCHs compared to PRBs conveying PDSCHs, according to an embodiment of the present invention.

FIG. 9 is a diagram illustrating additional DMRS density structures corresponding to an antenna port in PRBs conveying ePDCCHs, compared to PRBs conveying PDSCHs, according to an embodiment of the present invention. Specifically, FIG. 9 illustrates additional DMRS density structures corresponding to an antenna port in PRBs conveying ePDCCHs, compared to PRBs conveying PDSCHs for which a DMRS density is assumed to be as illustrated in FIG. 6.

Referring to FIG. 9, an increased DMRS density for a respective antenna port can be either in the time domain 910, the frequency domain 920, or in both the time domain and the frequency domain (for example, by combining 910 and 920). A UE may then apply conventional methods, such as time or frequency interpolation, to combine the additional DMRS REs with existing DMRS REs located in same positions as ones used for PDSCH demodulation, or the additional DMRS REs may remain empty and their respective power may be used to boost the transmission power of DMRS in existing REs.

Another alternative for improving an ePDCCH detection reliability is to have a larger maximum eCCE aggregation level for ePDCCH than the maximum cCCE aggregation level for cPDCCH. For example, possible cCCE aggregation levels can be L ∈ {1,2,4,8} while possible eCCE aggregation levels can be L ∈ {1,2,4,8,16}. Accordingly, the degradation in an ePDCCH reception reliability, from using a DMRS-based demodulation versus using a CRS-based demodulation as for the cPDCCH, can be compensated by an effective doubling of a received ePDCCH power from using L=16 instead of L=8.

In accordance with another embodiment of the present invention, a PUCCH resource determination for HARQ-ACK signal transmission from a UE in response to a reception of TBs conveyed in a PDSCH scheduled by a respective DL SA transmitted in an ePDCCH is utilized. Transmissions of HARQ-ACK signals associated with respective PDSCH receptions in a same DL subframe are in a same UL subframe, regardless of whether a PDSCH reception was scheduled by a cPDCCH or an ePDCCH.

The same implicit rule for a PUCCH resource determination is assumed to apply, as when only cPDCCH is transmitted. As cPDCCH transmissions always occur in a DL subframe, while ePDCCH transmissions may or may not occur, cCCEs may be ordered first with respect to a determination of PUCCH resources for HARQ-ACK signal transmission. Moreover, a UE may not be aware of an existence of an ePDCCH, if it is not configured for ePDCCH reception by a NodeB.

In a first approach, PUCCH resources for HARQ-ACK signal transmissions corresponding to ePDCCHs are consecutive to the ones corresponding to cPDCCHs. A UE determines a placement of PUCCH resources corresponding to ePDCCHs either by decoding a PCFICH to determine a number of OFDM symbols used for the transmission of cPDCCHs in a DL subframe or by considering a number of OFDM symbols for the transmission of cPDCCHs as informed by higher layer signaling. In either case, the number of OFDM symbols used for transmission of cPDCCHs in a DL subframe determines the maximum number of respective cCCEs.

Figure 10:
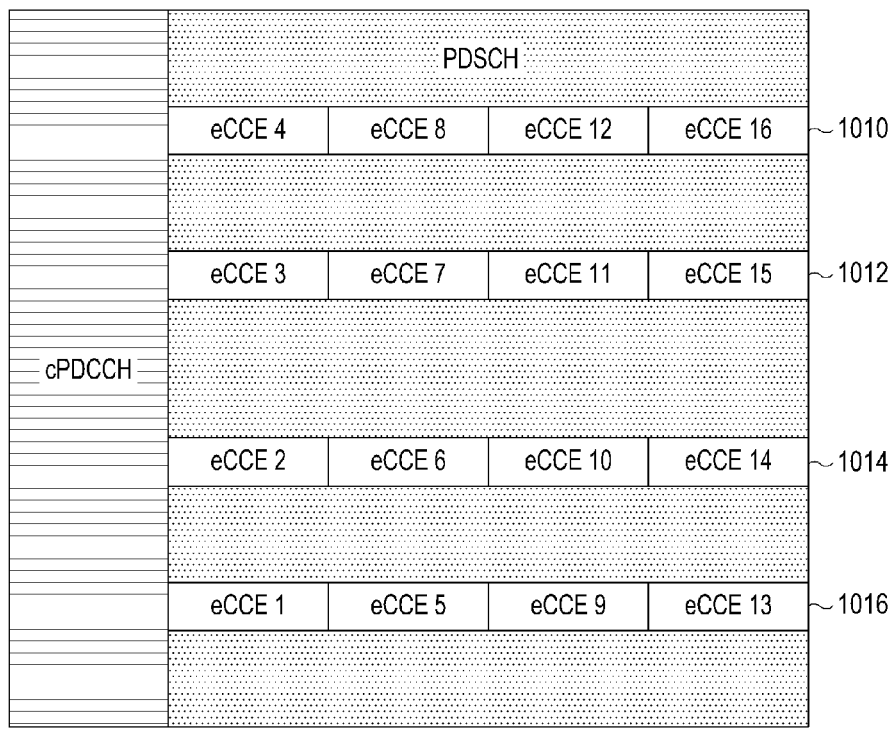
FIG. 10 is a diagram illustrating an ordering of cCCEs and of eCCEs for PUCCH resource determination for HARQ-ACK signal transmission, according to an embodiment of the present invention.
Figure 10:
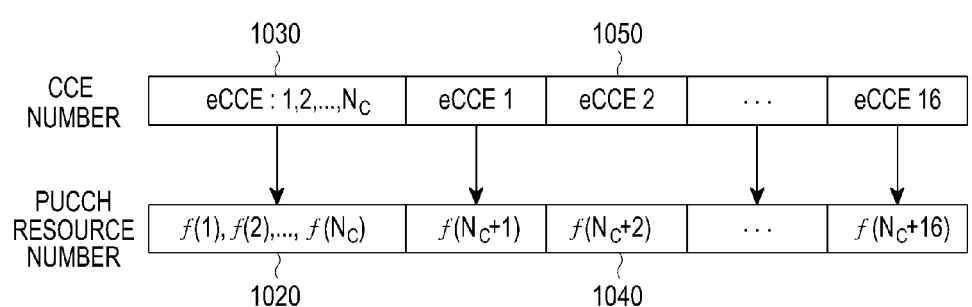

FIG. 10 illustrates an ordering of cCCEs and of eCCEs for PUCCH resource determination for HARQ-ACK signal transmission, according to an embodiment of the present invention.

Referring to FIG. 10, four PRBs are configured for potential transmissions of ePDCCHs 1010, 1012, 1014, and 1016. Each PRB includes four eCCEs which, for example, are first numbered in the frequency domain in ascending PRB order and then in the time domain (the eCCEs may alternatively be first mapped in the time domain in ascending order of PRBs). Assuming that a number of cCCEs corresponding to OFDM symbols used for transmissions of cPDCCHs is $N_c$, cCCEs are ordered first and PUCCH resources for respective HARQ-ACK signal transmissions are determined using the previously described conventional mapping with PUCCH resource $n_{PUCCH}=f(n_{CCE,C})$ 1020 corresponding to cCCE number $n_{CCE,C}$ 1030. Subsequently, eCCEs are mapped to PUCCH resources used for HARQ-ACK signal transmission with PUCCH resource $n_{PUCCH}=f(N_C+n_{CCE,E})$ 1040 corresponding to eCCE number $n_{CCE,E}$, which is the first eCCE of a respective ePDCCH 1050.

Although FIG. 10 considers that each PRB allocated to transmissions of ePDCCHs extends over all OFDM symbols of the DL subframe, alternatively, a subset of these OFDM symbols from the beginning of the DL subframe, and after the OFDM symbols used for the transmission of cPDCCHs, may be used for transmissions of ePDCCHs.

In accordance with another embodiment of the present invention, instead of PUCCH resources for HARQ-ACK signal transmissions corresponding to ePDCCHs being consecutive to the ones corresponding to cPDCCHs, UEs configured to receive only ePDCCH may independently determine these PUCCH resources by applying an offset to the PUCCH resources corresponding to cPDCCHs, e.g., by assuming a maximum PUCCH resources corresponding to cPDCCHs. This is advantageous, as a UE configured to receive only ePDCCH does not decode a PCFICH (a UE configured for ePDCCH decoding may also be configured by a NodeB through 1-bit RRC signaling whether or not to decode a PCFICH). This is applicable when a UE experiences poor DL SINR over an entire DL BW, due to inter-cell interference, and is allocated ePDCCH in interference protected PRBs (a PCFICH is transmitted substantially over the entire DL BW and cannot be protected from interference). The disadvantage is that some PUCCH resources will remain unused when a number of OFDM symbols for cPDCCHs is not a maximum one.

Figure 11:
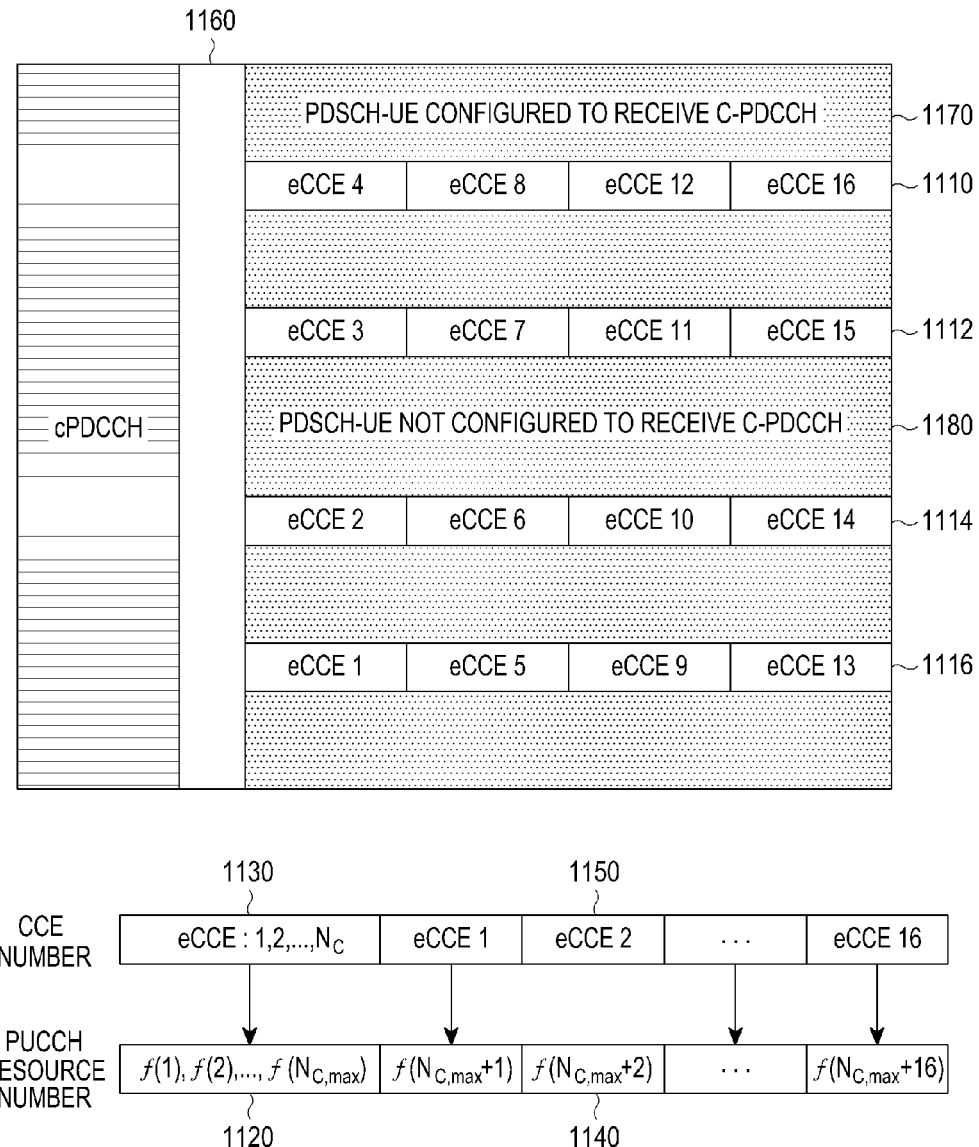
FIG. 11 is a diagram illustrating an ordering of cCCEs and of eCCEs for PUCCH resource determination for HARQ-ACK signal transmission, according to another embodiment of the present invention.

FIG. 11 illustrates an ordering of cCCEs and of eCCEs for PUCCH resource determination for HARQ-ACK signal transmission, according to an embodiment of the present invention.

Referring to FIG. 11, four PRBs are configured for potential transmissions of ePDCCHs 1110, 1112, 1114, and 1116. Each PRB includes four eCCEs which, for example, are first numbered in the frequency domain in ascending PRB order and then in the time domain (the eCCEs may alternatively be first mapped in the time domain in ascending order of PRBs). A UE configured by a NodeB to receive only ePDCCH does not decode a PCFICH and assumes a fixed number of cCCEs, such as a maximum number of cCCEs $N_{C,max}$, by assuming that a maximum number of OFDM symbols is used for transmissions of cPDCCHs. Therefore, a UE configured by a NodeB to receive only ePDCCH assumes that $N_{C,max}$ cCCEs are ordered first and PUCCH resources for respective HARQ-ACK signal transmissions are determined using the previously described conventional mapping with PUCCH resource $n_{PUCCH}=f(n_{CCE,C})$ 1120 corresponding to cCCE number $n_{CCE,C}$ 1130. Subsequently, eCCEs are mapped to PUCCH resources used for HARQ-ACK signal transmissions with PUCCH resource $n_{PUCCH}=f(N_{C,max}+n_{CCE,E})$ 1140 corresponding to eCCE number $n_{CCE,E}$ 1150.

When a number of OFDM symbols used in a DL control region for transmissions of cPDCCHs is less than a maximum one, PRBs in OFDM symbols after the last one of a DL control region for transmissions of cPDCCHs and up to a maximum possible one of a DL control region for transmissions of cPDCCH 1160 are used for PDSCH transmissions in same PRBs to UEs configured to receive cPDCCH 1170, but are not used for either ePDCCH or PDSCH transmissions in same PRBs to UEs configured to receive ePDCCH 1180.

For example, if a DL control region of a DL subframe for transmission of cPDCCHs uses M=1 OFDM symbol and a maximum possible number is three OFDM symbols, the second and third OFDM symbols are used for transmission of PDSCH to UEs configured to receive cPDCCH, but are not used for transmission of PDSCH to UEs configured to receive ePDCCH.

Although FIG. 11 considers that each PRB allocated to transmissions of ePDCCHs extends over all OFDM symbols of a DL subframe, alternatively, a subset of these OFDM symbols from the beginning of a DL subframe, and after the OFDM symbols used for the transmission of cPDCCHs, may be used for transmissions of ePDCCHs.

In accordance with another embodiment of the present invention, HARQ-ACK signal transmissions from UEs in response to respective ePDCCH detections share a same set of PUCCH resources with HARQ-ACK signal transmissions from UEs in response to respective cPDCCH detections. Collisions are avoided by determining a PUCCH resource for a former HARQ-ACK signal transmission as $n_{PUCCH}=f(n_{CCE,E}, HRI)$, where HRI is a HARQ-ACK Resource Indicator (HRI) field included in DCI formats conveyed by ePDCCHs scheduling PDSCHs (the HRI is not included in DCI formats conveyed by cPDCCHs scheduling PDSCHs).

For example, an HRI includes 2 bits where '00' maps to −2, '01' maps to −1, '10' maps to 0, and '11' maps to 1, and $n_{PUCCH}=f(n_{CCE,E}, HRI)=n_{CCE,E}+HRI\cdot N_{PUCCH}$. This approach is described in U.S. application Ser. No. 12/986, 675, entitled "Resource Indexing for Acknowledgement Signals in Response to Receptions of Multiple Assignments," which is incorporated by reference.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for receiving physical downlink shared channel (PDSCH) in a user equipment (UE), the method comprising:

receiving higher layer signaling for enhanced physical downlink control channel (EPDCCH);

receiving the PDSCH of which transmission starts in a first starting orthogonal frequency division multiplexing (OFDM) symbol determined by the higher layer signaling, if the UE is configured to receive the EPDCCH; and receiving the PDSCH of which transmission starts in a second starting OFDM symbol determined by a physical control format indicator channel (PCFICH), if the UE is not configured to receive the EPDCCH, wherein the UE has a UE-dedicated search space (UE-DSS) in which to monitor for a number of enhanced control channel elements (ECCEs) in a downlink (DL) subframe.

2. The method of claim 1, wherein the first starting OFDM symbol is configured by the higher layer signaling.

3. The method of claim 2, further comprising:
receiving the EPDCCH by using a plurality of enhanced control channel elements (ECCEs) in a downlink (DL) subframe, if the UE is configured to receive the EPDCCH,
wherein a number of the ECCEs is one of 1, 2, 4, 8, and 16.

4. The method of claim 2, further comprising:
receiving physical downlink control channel (PDCCH) by using a plurality of control channel elements (CCEs) in a downlink (DL) subframe, if the UE is not configured to receive the EPDCCH,
wherein a number of the CCEs is one of 1, 2, 4, and 8.

5. The method of claim 3, wherein the receiving of the EPDCCH starts in the first starting OFDM symbol, if the UE is configured to receive the EPDCCH.

6. A user equipment (UE) for receiving physical downlink shared channel (PDSCH), the UE comprising:
a receiver;
a non-transitory computer-readable memory; and
at least one processor configured to execute instructions stored in the non-transitory computer-readable memory, according to which the UE:
receives higher layer signaling for enhanced physical downlink control . channel (EPDCCH);
receives the PDSCH of which transmission starts in a first starting orthogonal frequency division multiplexing (OFDM) symbol determined by the higher layer signaling, if the UE is configured to receive the EPDCCH; and
receives the PDSCH of which transmission starts in a second starting OFDM symbol determined by a physical control format indicator channel (PCFICH), if the UE is not configured to receive the EPDCCH,
wherein the UE has a UE-dedicated search space (UE-DSS) in which to monitor for a number of enhanced control channel elements (ECCEs) in a downlink (DL) subframe.

7. The UE of claim 6, wherein the first starting OFDM symbol is configured by the higher layer signaling.

8. The UE of claim 7, wherein the UE further receives the EPDCCH by using a plurality of enhanced control channel elements (ECCEs) in a downlink (DL) subframe, if the UE is configured to receive the EPDCCH, and
wherein a number of the ECCEs is one of 1, 2, 4, 8, and 16.

9. The UE of claim 7, wherein the UE further receives physical downlink control channel (PDCCH) by using a plurality of control channel elements (CCEs) in a downlink (DL) subframe, if the UE is not configured to receive the EPDCCH, and
wherein a number of the CCEs is one of 1, 2, 4, and 8.

10. The UE of claim 8, wherein the receiving of the EPDCCH starts in the first starting OFDM symbol, if the UE is configured to receive the EPDCCH.

11. A method for transmitting physical downlink shared channel (PDSCH) in a base station, the method comprising:

transmitting, to a user equipment (UE), higher layer signaling for enhanced physical downlink control channel (EPDCCH);
transmitting the PDSCH of which transmission starts in a first starting orthogonal frequency division multiplexing (OFDM) symbol determined by the higher layer signaling, if the UE is configured to receive the EPDCCH; and
transmitting the PDSCH of which transmission starts in a second starting OFDM symbol determined by a physical control format indicator channel (PCFICH), if the UE is not configured to receive the EPDCCH,
wherein the UE has a UE-dedicated search space (UE-DSS) in which to monitor for a number of enhanced control channel elements (ECCEs) in a downlink (DL) subframe.

12. The method of claim 11, wherein the first starting OFDM symbol is configured by the higher layer signaling.

13. The method of claim 12, further comprising:
transmitting the EPDCCH by using a plurality of enhanced control channel elements (ECCEs) in a downlink (DL) subframe, if the UE is configured to receive the EPDCCH,
wherein a number of the ECCEs is one of 1, 2, 4, 8, and 16.

14. The method of claim 12, further comprising:
transmitting physical downlink control channel (PDCCH) by using a plurality of control channel elements (CCEs) in a downlink (DL) subframe, if the UE is not configured to receive the EPDCCH,
wherein a number of the CCEs is one of 1, 2, 4, and 8.

15. The method of claim 13, wherein the transmission of the EPDCCH starts in the first starting OFDM symbol, if the UE is configured to receive the EPDCCH.

16. A base station for transmitting physical downlink shared channel (PDSCH), the base station comprising:
a transmitter;
a non-transitory computer-readable memory; and
at least one processor configured to execute instructions stored in the non-transitory computer-readable memory, according to which the base station:
transmits, to a user equipment (UE), higher layer signaling for enhanced physical downlink control channel (EPDCCH);
transmits the PDSCH of which transmission starts in a first starting orthogonal frequency division multiplexing (OFDM) symbol determined by the higher layer signaling, if the UE is configured to receive the EPDCCH; and
transmits the PDSCH of which transmission starts in a second starting OFDM symbol determined by a physical control format indicator channel (PCFICH), if the UE is not configured to receive the EPDCCH,
wherein the UE has a UE-dedicated search space (UE-DSS) in which to monitor for a number of enhanced control channel elements (ECCEs) in a downlink (DL) subframe.

17. The base station of claim 16, wherein the first starting OFDM symbol is configured by the higher layer signaling.

18. The base station of claim 17, wherein the base station further transmits the EPDCCH by using a plurality of enhanced control channel elements (ECCEs) in a downlink (DL) subframe, if the UE is configured to receive the EPDCCH, and
wherein a number of the ECCEs is one of 1, 2, 4, 8, and 16.

19. The base station of claim 17, wherein the base station further transmits physical downlink control channel (PDCCH) by using a plurality of control channel elements (CCEs) in a downlink (DL) subframe, if the UE is not configured to receive the EPDCCH, and wherein a number of the CCEs is one of 1, 2, 4, and 8.

20. The base station of claim 18, wherein the transmission of the EPDCCH starts in the first starting OFDM symbol, if the UE is configured to receive the EPDCCH.

* * * * *